(12) United States Patent
Izumi et al.

(10) Patent No.: US 7,774,187 B2
(45) Date of Patent: Aug. 10, 2010

(54) SAFETY PROTECTION INSTRUMENTATION SYSTEM AND METHOD OF OPERATING THE SYSTEM

(75) Inventors: Mikio Izumi, Yokohama (JP); Toshifumi Hayashi, Yokohama (JP); Teruji Tarumi, Yokohama (JP); Shigeru Odanaka, Yokohama (JP); Naotaka Oda, Yokohama (JP); Toshiaki Ito, Yokohama (JP); Toshifumi Sato, Tama (JP); Hideyuki Kitazono, Fuchu (JP); Tatsuyuki Maekawa, Shinagawa-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 828 days.

(21) Appl. No.: 10/591,433

(22) PCT Filed: Mar. 4, 2005

(86) PCT No.: PCT/JP2005/003728

§ 371 (c)(1),
(2), (4) Date: Sep. 1, 2006

(87) PCT Pub. No.: WO2005/086175

PCT Pub. Date: Sep. 15, 2005

(65) Prior Publication Data

US 2007/0185700 A1    Aug. 9, 2007

(30) Foreign Application Priority Data

Mar. 4, 2004    (JP) .............................. 2004-061156

(51) Int. Cl.
*G06F 9/45* (2006.01)
(52) U.S. Cl. ........................................... 703/18; 716/4

(58) Field of Classification Search ................... 703/18; 434/218; 716/4
See application file for complete search history.

(56) References Cited

U.S. PATENT DOCUMENTS

| 4,517,154 | A  | * | 5/1985 | Dennis et al. | ................ 376/259 |
| 5,036,473 | A  | * | 7/1991 | Butts et al. | ..................... 703/23 |
| 5,621,776 | A  | * | 4/1997 | Gaubatz | ...................... 376/242 |
| 5,805,608 | A  | * | 9/1998 | Baeg et al. | ..................... 714/726 |
| 6,587,979 | B1 | * | 7/2003 | Kraus et al. | ................. 714/720 |
| 6,691,079 | B1 | * | 2/2004 | Lai et al. | ...................... 703/16 |
| 7,020,598 | B1 | * | 3/2006 | Jacobson | ..................... 703/14 |

(Continued)

FOREIGN PATENT DOCUMENTS

JP    49-19029    5/1974

(Continued)

OTHER PUBLICATIONS

Charles E. Stroud, Joe K. Tannehill, Jr., "Applying Build-In Self-Test to Majority Voting Fault Tolerant Circuits", IEEE, 1998, 6 pages.*

(Continued)

*Primary Examiner*—Dwin M Craig
(74) *Attorney, Agent, or Firm*—Oblon, Spivak, McClelland, Maier & Neustadt, L.L.P.

(57) ABSTRACT

A safety protection instrumentation system for a nuclear reactor is constructed by using digital logic. The digital logic includes functional units in which output logic patterns corresponding to all input logic patterns are verified in advance and a functional module formed by combining the functional units.

13 Claims, 9 Drawing Sheets

U.S. PATENT DOCUMENTS 7,512,917 B2 * 3/2009 Izumi et al. .................... 716/5

FOREIGN PATENT DOCUMENTS

| JP | 2002-341037 | 11/2002 |
|---|---|---|
| JP | 2003-287587 | 10/2003 |
| JP | 2004-317183 | 11/2004 |
| JP | 2004-318254 | 11/2004 |
| WO | WO 00/41101 | 7/2000 |

OTHER PUBLICATIONS

Charles E. Stroud, et al., "Applying Built-In Self-Test to Majority Voting Fault Tolerant Circuits", VLSI Test Symposium, 1998. Proceedings. 16$^{th}$ IEEE Monterey, CA, USA, Apr. 26-30, 1998, Los Alamitos, CA, USA, IEEE Comput. Soc, US, Apr. 26, 1998, pp. 303-308, XP010277179.

R. E. Battle, et al., "Reactor Protection System Design Using Application-specific Integrated Circuits", Jan. 1, 1900, pp. 389-396, XP009106740.

T. Kobayashi, et al., Database Inspec, The Institution of Electrical Engineers, Stevenage, GB; 1991, "Review of structure and reliability of active delay line", AN 4028563, XP002498963, 1 page (abstract).

Takashi Nanya, et al., "On signal Transition Causality for Self-Timed Implementation of Boolean Functions", System Sciences, 1993, Proceeding of the Twenty-Sixth Hawaii International Onal Conference on Wailea, HI, USA, Jan. 5-8, 1993, Los Alamitos, CA, USA, IEEE, US, vol. 1, Jan. 1993, pp. 359-368, XP010640404.

B. S. Kong, et al., :CMOS differential logic family with self-timing and charge-recycling for high-speed and low-power VLSI, IEE Proceedings: Circuits Devices and System, Institution of Electrical Engineers, Stenvenage, GB, vol. 150, No. 1, Feb. 6, 2003, pp. 45-50,XP006019670.

* cited by examiner

VHDL STATEMENT

```
-Comparator ver0 1 library IEEE;use IEEE.std_logic_1164.all;

entity COMPARATOR is
generic(WIDTH : integer:=4);
port(CLK : in std_logic;
   aclr : in std_logic;
   INP : in std_logic_vector(WIDTH-1 downto 0);
   REF : in std_logic_vector(WIDTH-1 downto 0);
   GT : out std_logic;
   EQ : out std_logic;
   LT : out std_logic);
end COMPARATOR;

architecture RTL of COMPARATOR is
Begin process(CLK,aclr) begin if(aclr = '0')then
   GT <='0';
   EQ <='0';
   LT <='0';
elsif(CLK' event and CLK='1')then
   if INP>REF then
      GT<='1';EQ<='0';LT<='0';
   elsif INP < REF then
      GT<='0';EQ<='0';LT<='1';
   elsif INP = REF then
      GT<='0';EQ<='1';LT<='0';
   else
      GT<='X';EQ<='X';LT<='X';
   end if;
  end if;
end process;
end RTL;
```

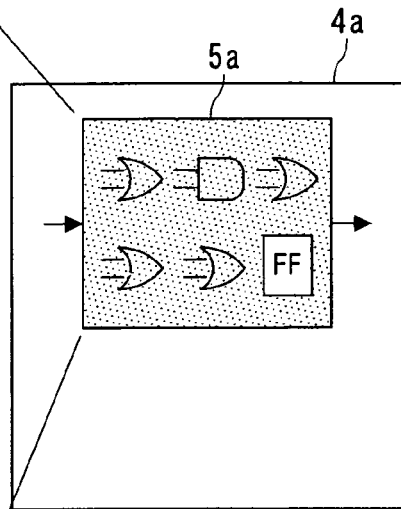

FIG. 5

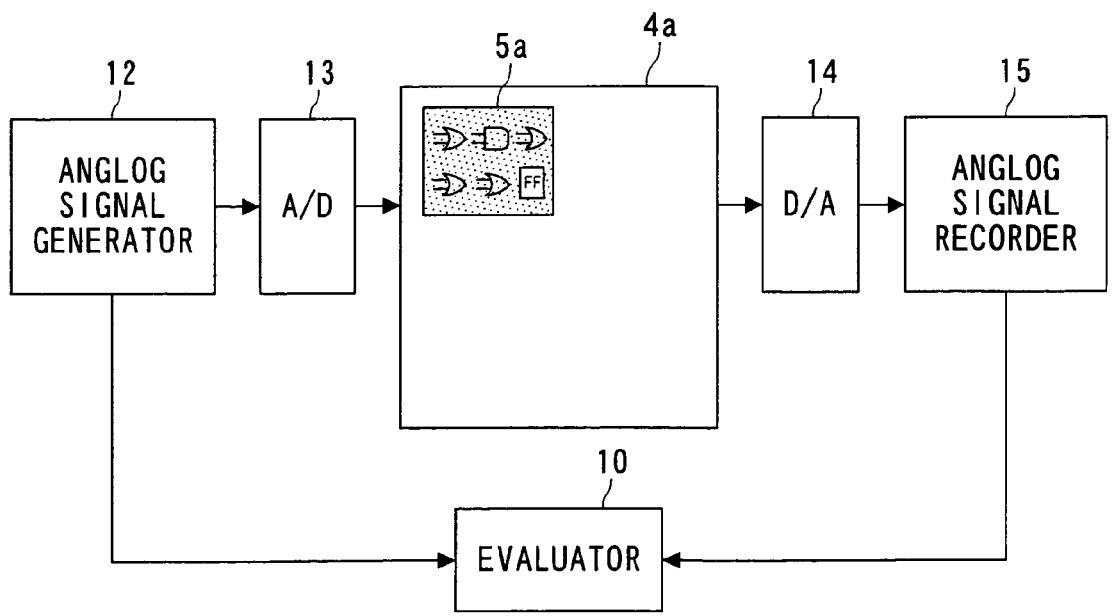

FIG. 6

SAFETY PROTECTION INSTRUMENTATION SYSTEM AND METHOD OF OPERATING THE SYSTEM

TECHNICAL FIELD

The present invention relates to a safety protection instrumentation system that includes a reliable digital signal processing apparatus and is used in, for example, a safety protection system in a nuclear plant. The invention also relates to a method of operating or handling the safety protection instrumentation system.

BACKGROUND ART

Nuclear plants are provided with safety protection instrumentation systems for preventing or suppressing failures that can degrade the safety of the plants, or that are expected to occur. A radiation measuring apparatus in the safety protection instrumentation system is intended to provide each operating circuit with information indicating conditions for isolating parts where the radiation dose has increased, or actuating emergency gas treatment apparatus in order to suppress radioactive material from leaking outside the plant if the radiation dose in the plant has increased for any reason.

In recent plants, a digital signal processing technology is applied to these radiation-measuring apparatuses in the safety protection instrumentation systems. In the digital signal processing, CPUs perform digital calculation involving a digital filter and/or multiple signals (for example, refer to Japanese Patent Application No. 2653522). In contrast, there are systems using ASIC/FPGA (Application Specific Integrated Circuit/Field Programmable Gate Array), which is hardware logic, without using the CPUs (for example, refer to U.S. Pat. No. 5,859,884). In such systems, instead of the CPUs, ASICs control the procedures to simplify the operations.

The safety protection instrumentation systems serving an important function are required to, for example, prevent function loss due to single failure by providing multiple or independent devices. In the digital systems using software, the function of the multiplexed devices can be lost due to software failure when the same software is used in the redundant systems. In addition, since the digital processing is discrete processing, the possibility of unexpected behaviors, such as abnormal outputs due to internal failure, in the digital systems is higher than that in analog devices if a series of specific conditions unfortunately occur.

Accordingly, it is necessary not only to perform a quality assurance activity for ensuring high quality throughout the design and manufacturing but also to eliminate failures due to common factors caused by software faults and to adopt appropriate protective means against modifications out of control in the digital processing using software. Particularly, a verification and validation activity (hereinafter referred to as "V&V") is performed as one method of preventing failures due to common factors caused by software faults. The "V&V" is a quality assurance activity including verification of whether the functions required of the digital protection systems are correctly reflected from upper processes of software design and manufacturing to lower processes thereof and validation of full realization of the required functions in the systems manufactured through the verification.

In contrast, since systems using the ASICs or FPGAs, instead of CPUs, are built as hard-wired logic, the processing is determinant and, therefore, the processing time is determinable, unlike the processing by the CPUs. The systems using the FPGAs can be assumed to be semiconductor devices having the digital logic, so that it is possible to verify the systems by the use of methods of testing the semiconductor devices. Specifically, it is possible to fully verify stationary input-output characteristics other than failures due to timing if the outputs corresponding to all the inputs and all the internal states in the logic of the semiconductor devices can be compared with predicted values calculated from design specifications. This verification method is called exhaustive testing.

However, since combining the number of full input bits with the internal states of the device produces a large number of patterns in the actual ASIC device, it is difficult to compare all the output patterns corresponding to all the input and internal-state patterns with the predicted values. Accordingly, it becomes important to evaluate an input pattern sequence in which failures can be efficiently found. For example, the logic patterns in the device are evaluated to estimate input pattern groups in which the internal registers operate at least one time or "stack at fault" fault models, or the input patterns sequence, in which failures can be found are calculated by fault simulation.

However, since only some of the input patterns are tested in the above verification method, there are problems in that faults occurring due to the combination of the internal logic, or faults that are not estimated in the fault simulation cannot be detected.

In addition, in a process of implementing the logic in hardware, such as FPGA, it is necessary to prepare software in which the structure of the hardware is described and to prepare a general-purpose software tool, such as a synthesis tool for converting the software (HDL: Hardware Description Language) into the actual logic of the FPGA. Consequently, it is necessary to ensure a higher reliability even in the design phase in order to eliminate the faults in off-the-shelf software.

If the above-mentioned exhaustive testing can be used in performance verification of an instrumentation system, it is possible to indicate that there is no static logic error (no determinate logic error). However, if the above verification method cannot be carried out, it seems that the verification, such as the V&V, is required as in the known software.

The system using the FPGA performs determinant processing, unlike the processing by the CPU, and the processing time is generally determinable. In addition, the system using the FPGA is characterized by easily meeting the design conditions for building a highly reliable system because a single loop executes only one process.

As described above, in terms of the verification of the instrumentation system, implementing the safety system for a nuclear plant in hardware logic gives greater benefit. However, the challenge is to validate the instrumentation system in the verification level equivalent to exhaustive testing. Consequently, there is demand for a system allowing easy confirmation of whether the output characteristics corresponding to the inputs comply with the design specifications and for a verification method using the system.

In addition to the static logic error, described above, errors due to internal operation timing can occur. For example, if the delay time of the transmission in the internal logic is varied due to environmental conditions, including temperature, the system can operate improperly. In data exchange with an asynchronous unit, such as an external unit, determinant values might not be yielded depending on the acceptance timing of the data.

In order to prevent errors due to timing, it is necessary to design the system allowing for errors by timing simulation or the like, and to apply a general design technique, such as adoption of a synchronous design in which the values are less apt to be indeterminate, to the external interface.

In other words, it is important to adopt structures and test methods capable of preventing errors due to timing even in the safety systems using the FPGAs and there is a demand for development of systems having such structures and test methods.

DISCLOSURE OF THE INVENTION

The present invention was conceived in consideration of the above circumstances and an object of the present invention is to provide a safety protection instrumentation system for a nuclear reactor, which uses hardware logic, such as FPGA, and is capable of preventing static logic errors and errors due to the timing of signal processing and to provide a method of operating (handling) the safety protection instrumentation system.

In order to solve the above problem, according to the present invention, there is provided a safety protection instrumentation system for a nuclear reactor, which is constructed by using digital logic, wherein the digital logic includes functional units in which output logic patterns corresponding to all input logic patterns are verified in advance and a functional module formed by combining the functional units.

The safety protection instrumentation system having the above features can be embodied in the following modes.

Each of the functional units may individually implement the output logic patterns corresponding to all the input logic patterns on hardware and may determine whether the output values coincide with predicted values calculated from design specifications.

The functional module may include only the functional units having the same gate structure as that of the functional units whose performance is verified in advance.

The functional module formed by a combination of the functional units may include a register through which outputs from the functional units are transmitted and a delay element used for adjusting the timings of signal processing in the functional units.

The functional module formed by a combination of the functional units may include a register through which outputs from the functional units are transmitted and may use handshaking for transferring signals between the functional units that drive the register at different clock frequencies, among the functional units.

The safety protection instrumentation system can include digital logic circuits converted from software (HDL) in which effective programs statements executed by hardware and input pattern groups indicating operation paths are described, can use branch coverage or toggle coverage for evaluating the ratio of the input logic patterns or determining whether the number of the input patterns is sufficient, and can determine whether the output logic patterns corresponding to the input logic patterns coincide with predicted patterns calculated from design specifications to verify the connection between the functional units.

It is possible to structure the safety protection instrumentation system so as to generate input patterns in accordance with design specifications of the functional module and so as to determine whether the output patterns corresponding to the input patterns in the functional module coincide with predicted values calculated from the design specifications.

The safety protection instrumentation system can include an analog-to-digital element that converts an analog signal pattern in accordance with design specifications of the functional module into a digital value to generate a digital input pattern and a digital-to-analog element that converts an output corresponding to an input in the functional module into an analog value, and can determine whether the analog value coincides with a predicted value calculated from the design specifications.

The safety protection instrumentation system can perform addition or comparison of two variables in the functional unit to replace either one of the two variables with a constant that can be specified with an address having the number of bits smaller than that of the variable.

The functional unit may have a function of passing an operation flag indicating normal completion of the operation, the functional module may have a function of monitoring the operation flag, and the safety protection instrumentation system may include a trip evaluator that receives an output from the functional module and determines whether the operation flag is set, and an abnormality diagnosis circuit that outputs an abnormal operation signal if the operation flag is not set.

The functional unit may have a function of calculating maximum and minimum output values by a simple expression and a function of passing the maximum and minimum output values. The safety protection instrumentation system may include a trip evaluator that compares signal values with the maximum and minimum output values to determine whether the signal values are appropriate, and an abnormality diagnosis circuit that outputs an abnormal operation signal.

The safety protection instrumentation system can include a first safety protection instrumentation system that converts a digital output into an analog value and converts the analog value into an optical signal, and a second safety protection instrumentation system that converts the optical signal into an analog value and converts the analog value into a digital value. The first safety protection instrumentation system can be connected to the second safety protection instrumentation system.

According to the present invention, the above objects are achieved by providing a method of operating a safety protection instrumentation system for a nuclear reactor, including digital logic, wherein output logic patterns corresponding to all input logic patterns into functional units in the safety protection instrumentation system are verified in advance.

In the above method, data processing in the functional units in the safety protection instrumentation system may be serially performed in the order of connection, and the serial transmission of a signal may be confirmed by monitoring an output timing and whether the signal is output as designed may be determined to verify the performance of the safety protection instrumentation system.

The functional units may include verifying whether the functional units in the safety protection instrumentation system have the same internal structure when the performance of the functional units is verified.

With the safety protection instrumentation system and the method of operating the system, having the above features, according to the present invention, it is possible to improve the safety of the safety system for the nuclear reactor using the hardware logic by preventing logic errors or errors due to the timing of the signal processing.

BRIEF DESCRIPTION OF THE DRAWINGS

FIG. 5 illustrates a logic structure test using branch coverage as an index.

FIG. 6 is a block diagram illustrating verification of a signal by the use of AD and DA elements.

BEST MODE FOR CARRYING OUT THE INVENTION

Embodiments of a safety protection instrumentation system for a nuclear reactor according to the present invention will be described with reference to the accompanying drawings.

First Embodiment

Figure 1:
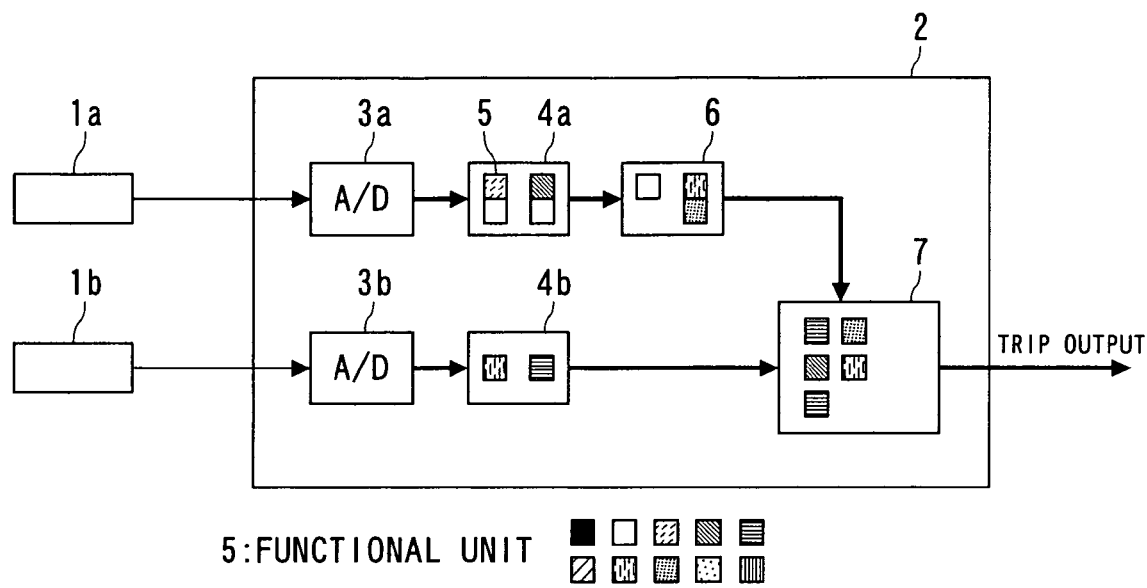
FIG. 1 is a block diagram showing a logic structure of a safety protection instrumentation system of the present invention, including functional units whose input-output characteristics are verified.

FIG. 1 is a block diagram showing a logic structure of a safety protection instrumentation system according to a first embodiment of the present invention.

Referring to FIG. 1, outputs from sensors 1a and 1b disposed in a nuclear reactor are supplied to a safety protection instrumentation system 2 that detects any error and outputs a trip signal. The safety protection instrumentation system 2 includes AD elements 3a and 3b that perform waveform shaping for the analog signals output from the sensors 1a and 1b, amplify the analog signals, and convert the amplified analog signals into digital values. The digital values supplied from the AD elements 3a and 3b are subjected to signal conversion in filter circuits 4a and 4b. The filter circuits 4a and 4b each include multiple functional units 5. In the safety protection instrumentation system 2 in FIG. 1, the filter circuit 4a, the filter circuit 4b, a signal processing circuit 6, and a trip evaluator 7 are functional modules.

The logic structure and operation of each of the functional units 5 will be described hereunder.

The functional units 5 include, for example, a D flip-flop, a latch, an 8-bit decoder, an 8-bit counter, an 8-bit serial-to-parallel converter, an 8-bit adder, an 8-bit multiplier, and an 8-bit comparator. The functional units 5 are logic capable of confirming whether the output patterns corresponding to all the input patterns in the functional units 5 coincide with the predicted patterns calculated from design specifications.

The number of input bits, which is eight in the first embodiment, is limited to the number of bits that can be actually tested. Using the functional units 5 in which all the input patterns are verified to build each internal function (functional module) and the entire safety protection instrumentation system for a nuclear reactor can realize the safety protection instrumentation system with a higher reliability, capable of verification for all the input patterns.

Figure 2:
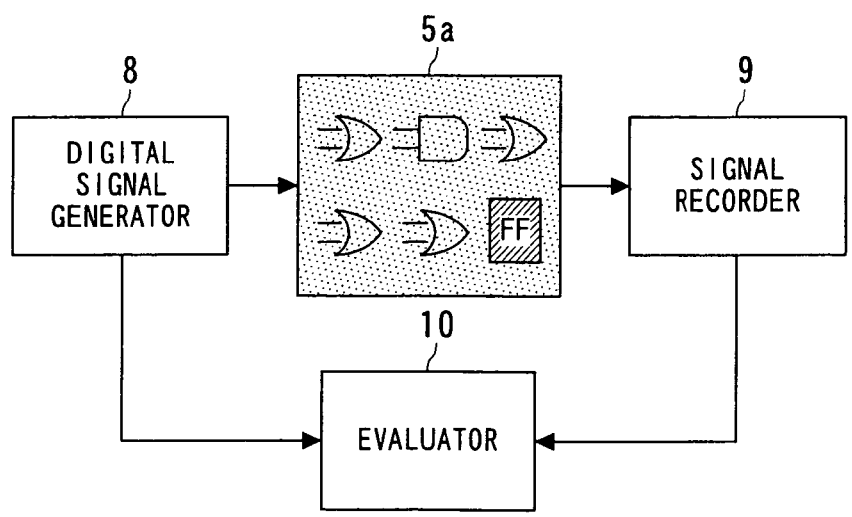
FIG. 2 is a block diagram showing a logic structure in which the input-output characteristics of the functional units are tested.

FIG. 2 is a block diagram showing a logic structure in which a functional unit 5a is tested. Alphabetic characters are added to the functional units 5 in order to discriminate the functional units 5 having different logic structures in the following description. The functional unit 5 with no any alphabetic character means the functional unit describing a common logic structure.

As shown in FIG. 2, the functional unit 5a is implemented in actual hardware to receive a signal supplied from a digital signal generator 8. An output from the functional unit 5a is measured in a signal recorder 9 and the measured signal is supplied to an evaluator 10. The evaluator 10 compares the received signal with a predicted pattern corresponding to the input pattern to detect any error occurring in the functional unit 5a. If no error is detected for all the input patterns in the functional unit 5a, the functional unit 5a is validated.

As described above, implementing the functional unit in the FPGA, actual hardware, to test the functional unit permits errors in off-the-shelf software, including a synthesis tool and a writing tool in the FPGA, to be simultaneously verified.

The functional unit 5 includes basic elements specific to the FPGA hardware, such as an AND circuit and an OR circuit. However, when the functional units 5 are combined with each other to realize the functional module, the functional module having a logic structure different from the logic structure when the functional unit 5 is verified alone is implemented in the hardware because the synthesis tool optimizes the logic or the combination of the basic elements. Accordingly, options of the synthesis tool or a place and route tool to be implemented in the FPGA are selected so as not to optimize the logic structure when the functional units 5 are combined with each other and it is confirmed whether the same logic structure as the one used in the verification is implemented in the functional module, before the functional module is built.

Further, after the entire safety protection instrumentation system is completed, visual checking of whether the internal functional units 5 have the same logic structure as in the testing is made so as to confirm whether the safety protection instrumentation system includes the verified functional units 5.

Figure 3:
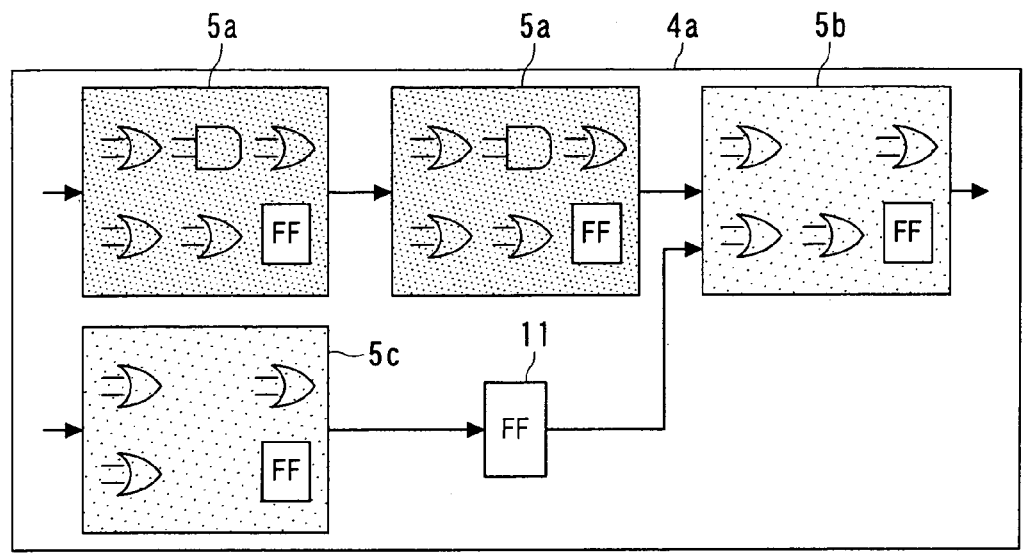
FIG. 3 is a block diagram illustrating the internal logic structure of a functional module.

FIG. 3 is a block diagram showing a logic structure in which the functional units 5 are implemented in the filter circuit 4a. FIG. 3 shows the functional module including the functional unit 5a tested in the logic structure in FIG. 2.

Adopting a logic structure including a flip-flop that outputs a signal allows the functional unit 5a to be implemented in the functional module with the internal logic structure being kept. For example, a 24-bit adder can be formed by combining two verified 12-bit adders. The safety protection instrumentation system according to the present invention is provided with a flip-flop for every output from the 12-bit adders in order to retain the logic structure of the 12-bit adder. The flip-flop indicates two circuits configured to keep a stable state. The output from the 12-bit adder having the above logic structure delays by the amount corresponding to two clock periods on the assumption that the flip-flop operates at one clock frequency.

In the safety protection instrumentation system according to the present invention, an arithmetic circuit that has a large number of input bits and outputs the arithmetic result at one clock frequency is divided into functional units $5a$, $5b$, and $5c$ which have a small number of input bits and whose function can be verified to yield the arithmetic results at multiple clock frequencies. This logic structure can realize easy verification of the functions corresponding to all the input patterns and can prevent errors due to the timing of the logic.

The timing error occurs when the delay time caused by a combination of the logic between the flip-flops becomes longer than the clock period during which the flip-flop is driven. The division of the combined circuit, as in the safety protection instrumentation system according to the first embodiment, can shorten the delay time and allows the timings to be individually verified. Since the number of clocks before the output has been yielded is varied depending on the number of combinations of the functional units in the logic structure shown in FIG. 3, a delay element 11 is provided to adjust the timings when comparison between two signals or addition thereof is to be performed.

Figure 4:
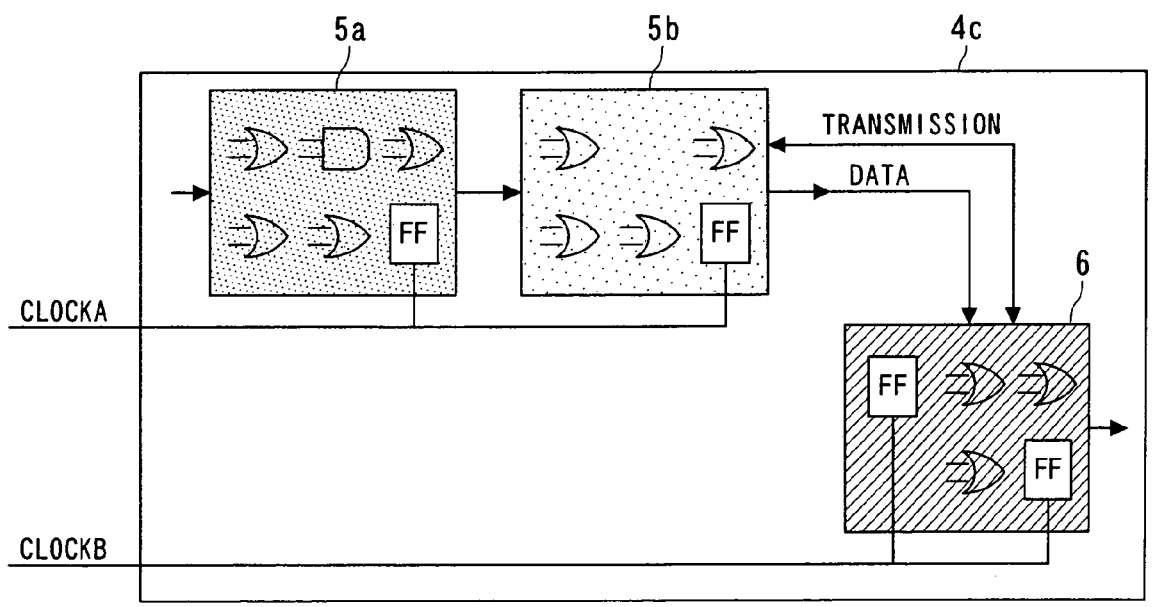
FIG. 4 is a block diagram illustrating synchronization of the clock frequency between the functional modules and signal transmission by handshaking in asynchronous sections.

FIG. 4 is a block diagram showing a logic structure in which a clock signal and data are transferred between the functional units.

In order to reduce the number of timing errors during the data transfer between the functional units 5, a logic structure is adopted in which the flip-flops in the functional units 5 are driven in the same clock period and at the same timing, such as at a clock rising edge.

When the functional units 5 are driven in different clock periods, using handshaking for determining whether the data can be transmitted and received between the functional unit $5b$ and the signal processing circuit 6, as shown in FIG. 4, to ensure the data transfer can eliminate the timing errors due to the connection of the functional units.

As described above, according to the safety protection instrumentation system of the first embodiment, incorporating the functional units whose input and output patterns are verified into each functional module with the internal logic structure being retained can eliminate any stationary logic error. In addition, the provision of the flip-flop in each functional unit can design the safety protection instrumentation system so as to allow for the timing errors, which are also likely to occur, thus facilitating the verification of the timing in the functional module. Furthermore, the use of the handshaking in the data transfer between the functional units can eliminate the timing errors due to the connection of the functional units.

Second Embodiment

Since the logic in the functional units normally functions in the safety protection instrumentation system according to the first embodiment, it is possible to eliminate the timing errors by normal connection of the logic. However, there is a possibility that the functional units are incorrectly connected to each other or the software includes functional units that are not described in the design specifications. A safety protection instrumentation system according to a second embodiment of the present invention will be described as a method of resolving the above problems.

FIG. 5 shows one example of software (VHDL statements) describing a comparator, according to the safety protection instrumentation system of the second embodiment.

The functional unit $5a$ is invoked by a "port" statement in the VHDL description. Since the numeric patterns in the functional unit $5a$ have been verified in advance, it is determined that the functional units are correctly connected to each other if normal invocation of the functional unit $5a$ can be confirmed in the VHDL grammar.

Specifically, if the operation of the VHDL statements contributable to actual execution of the VHDL statements, excluding the definition statements and the sections corresponding to redundant processing generated in preparation for abnormalities, among the VHDL statements in FIG. 5 can be verified in the logic structure according to the second embodiment, it is possible to determine that the functional units are correctly connected to each other.

Coverage is generally used as one parameter used for determining whether the VHDL statements are executed. The ratio of the VHDL statements executed in the software to all VHDL statements is called statement coverage. If the VHDL statements include any branch, such as an "IF" statement, the ratio of the number of executed paths, given by counting both the success and the failure of the branch, to the number of patterns in the entire path is called branch coverage. The ratio of the signals whose level is shifted from "High" to "High" through "Low" (High→Low→High) to the signals in the functional units 5 is called toggle coverage.

The safety protection instrumentation system according to the second embodiment uses the branch coverage or the toggle coverage as an evaluation index to generate the input pattern groups in which all the branch conditions succeed. The safety protection instrumentation system determines that the functional units are correctly connected to each other if the output patterns corresponding to the input patterns coincide with the predicted patterns calculated from the design specifications. Particularly, the toggle coverage can be evaluated in a netlist after the logic synthesis and is not likely to be affected by the logic synthesis.

The correct connection of the functional units 5 can be confirmed by a functional test for confirming whether the functional module has the same function as in the design specifications. Specifically, the connection of the functional units can be verified by generating the input pattern groups used for confirming the performance described in the specifications and comparing the outputs corresponding to the input pattern groups with the predicted values to determine whether there is no difference between the outputs and the predicted values.

In the functional test for confirming the functions of the functional module, the digital values are input and the digital outputs are compared with the predicted values to determine whether there is any difference between the outputs and the predicted values. However, in the comparison of the digital values, it takes several microseconds to several milliseconds to test one pattern and, therefore, it is difficult to quickly evaluate the many signal patterns.

Accordingly, as shown in FIG. 6, a signal output from an analog signal generator 12 is supplied to the functional module $4a$ through an A/D element 13. The signal output from the functional module $4a$ is converted into an analog signal in a D/A element 14 and the analog signal is measured by an analog signal recorder 15. The measured signal can be compared with the predicted value calculated from the design specifications to quickly determine whether there is a difference between the output value and the predicted value. In the method using the A/D element 13 and the D/A element 14, as in the example according to the second embodiment, a significant amount of variation that exceeds the measurement accuracy and affects the measurement result can be detected to verify the function. A minor difference cannot be detected, unlike the comparison of the digital values. In addition, since the many patterns can be quickly processed, the method is effective for detection of discontinuous points or singular points specific to the digital values.

Figure 7:
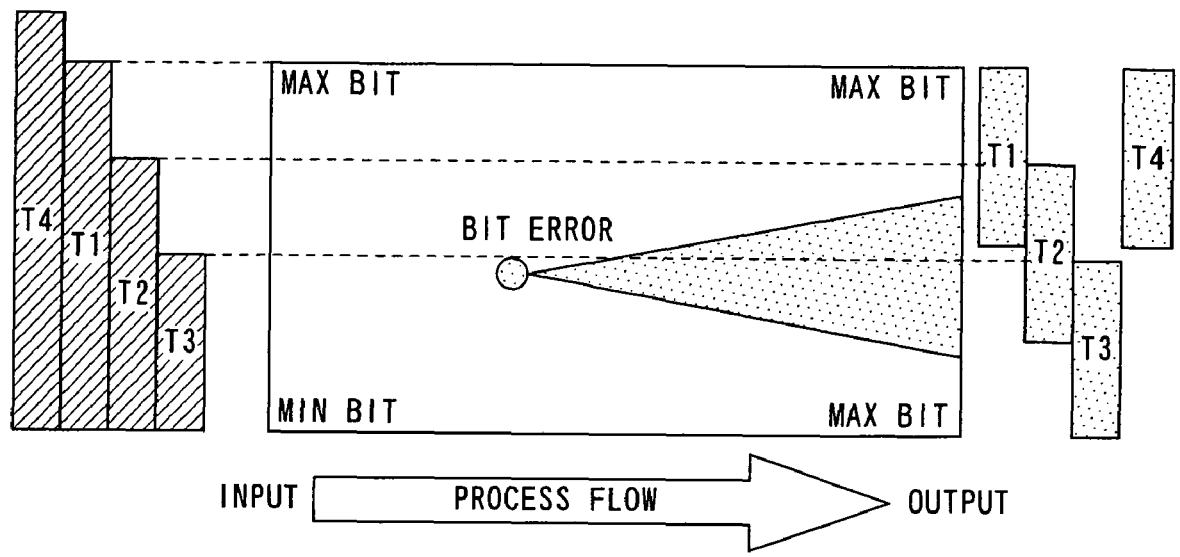
FIG. 7 illustrates a way to adjust the level of an input signal to verify any error.

Methods of selecting a test pattern used in the functional test will be described with reference to FIGS. 7 and 8. FIG. 7 shows an example of a method of selecting a level of the input signal when the functional module, which is a filter circuit, is verified. Referring to FIG. 7, the vertical axis schematically represents the bit width of numerical values and the horizontal axis represents the amount of processed logic.

If an error occurs in a procedure having a certain number of bits in the functional module, which is a filter circuit, the error is propagated to the downstream processing, as shown in FIG. 7, with no limitation on the values because the filter circuit is a linear circuit. If the output is subjected to the D/A conversion and the analog value is evaluated, a variation in a lower bit of the output cannot be measured due to an effect of the D/A element and a noise in the circuit.

Accordingly, dividing the level of the input signal into, for example, levels T1 to T4 and measuring the variation in the output ranges corresponding to the respective input levels can detect any error of a full bit width in the digital value. In other words, adjusting the level of the input signal in accordance with the detection accuracy of the errors in the output allows any error inside the filter circuit to be detected.

Figure 8:
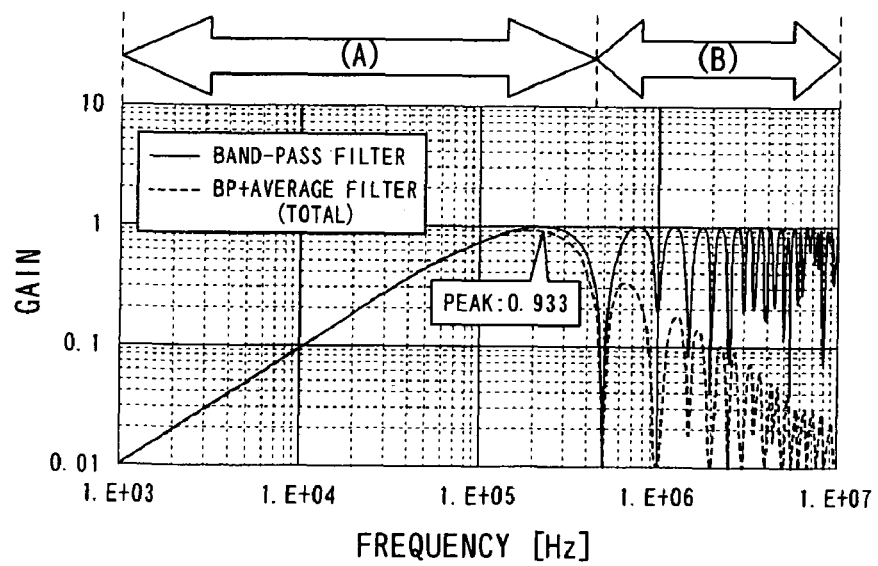
FIG. 8 illustrates a way to verify frequency characteristics of signals.

FIG. 8 illustrates a way to select a measuring point of the frequency when the frequency characteristics are tested.

Since the digital filter is a linear time invariant system, the digital filter can be evaluated by the use of a typical frequency if it is designed so as not to cause overflow. In addition, since the digital filter has a frequency characteristic that returns back at a point half of the sampling frequency, the frequency characteristics are basically verified in a frequency range lower than the half of the sampling frequency. In a range not less than the half of the sampling frequency, only valleys appearing at frequencies that are multiples of the half of the sampling frequency are detected.

A frequency characteristic given by combining a high-pass filter having a sampling frequency of 1 MHz with a low-pass filter having a sampling frequency of 40 MHz is shown in the waveform example in FIG. 8. Referring to FIG. 8, a solid line represents the frequency characteristic of high-pass filter of 1 MHz and a broken line represents the combined frequency characteristic.

Since the frequency characteristic shown by the solid line has a sampling frequency of 1 MHz, the frequency characteristic returns back at 500 kHz. Accordingly, verifying the frequency characteristics in an area A in a frequency range lower than 500 kHz allows the characteristics of the high-pass filter to be verified.

In contrast, in the low-pass filter having a sampling frequency of 40 MHz, shown by the broken line, the attenuation characteristics should be verified in a bandwidth lower than 20 MHz in an area B. However, since the peak and valley characteristics are repeated in the frequency range lower than 20 MHz due to the effect of the high-pass filter, the envelop curve is evaluated to select frequencies corresponding to the peaks and to verify the attenuation characteristics of the low-pass filter. In other words, when the frequency characteristics of the digital filter are verified, the frequency band is divided at a frequency half of the sampling frequency and a measurement point is selected in accordance with the design specifications.

As described above, according to the safety protection instrumentation system of the second embodiment, it is possible to confirm whether all the functional units in the functional module are correctly connected by generating all the input patterns having branch coverage of 100% and sequentially validating the output patterns corresponding to the input patterns. In addition, the correct connection of the functional units can be validated by the function test in which the function of each functional module is tested. In the function test, the comparison of the analog signals by the use of the A/D element and the D/A element allows continuous testing of the many patterns, thus easily verifying the performance of the safety protection instrumentation system for the nuclear reactor.

Third Embodiment

Figure 9:
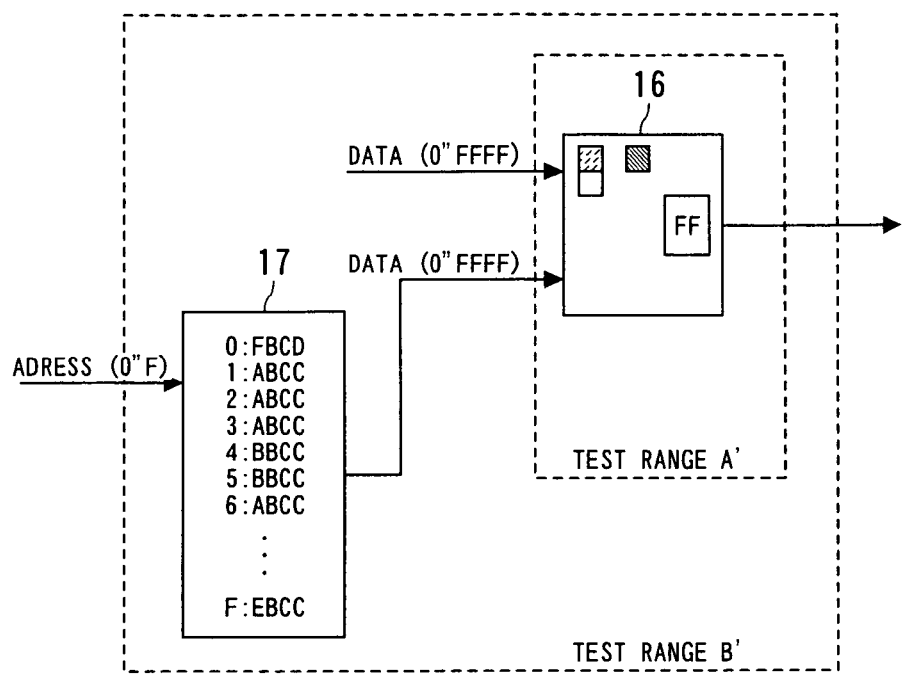
FIG. 9 is a block diagram illustrating a way to decrease the number of test patterns of the functional units by the use of a lookup table.

FIG. 9 shows test ranges when the output patterns corresponding to the input patterns are verified by the use of an adder 16.

In a test range A' including only the adder 16 as the functional unit, since the adder receives two 16-bit inputs and the number of all the input patterns is equal to 2(16+16), it is difficult to verify the input patterns in a few days. However, a signal variable is multiplied by a constant number in most patterns in the filtering.

Consequently, as shown in FIG. 9, the safety protection instrumentation system of the third embodiment has a logic structure in which a constant is selected from a lookup table (LUT) and the selected constant is supplied to the adder 16.

When a test range B' is used as the functional unit in the safety protection instrumentation system having the above logic structure, the data to be selected has a four-bit address. Accordingly, since the number of input bits in the test range B' is 4+16=20 and the number of test patterns is equal to 2(4+16), it is easy to test and evaluate the outputs corresponding to all the input patterns.

As described above, according to the safety protection instrumentation system of the third embodiment, providing the lookup table in the functional unit allows the number of all the input patterns to be decreased.

Fourth Embodiment

Figure 10:
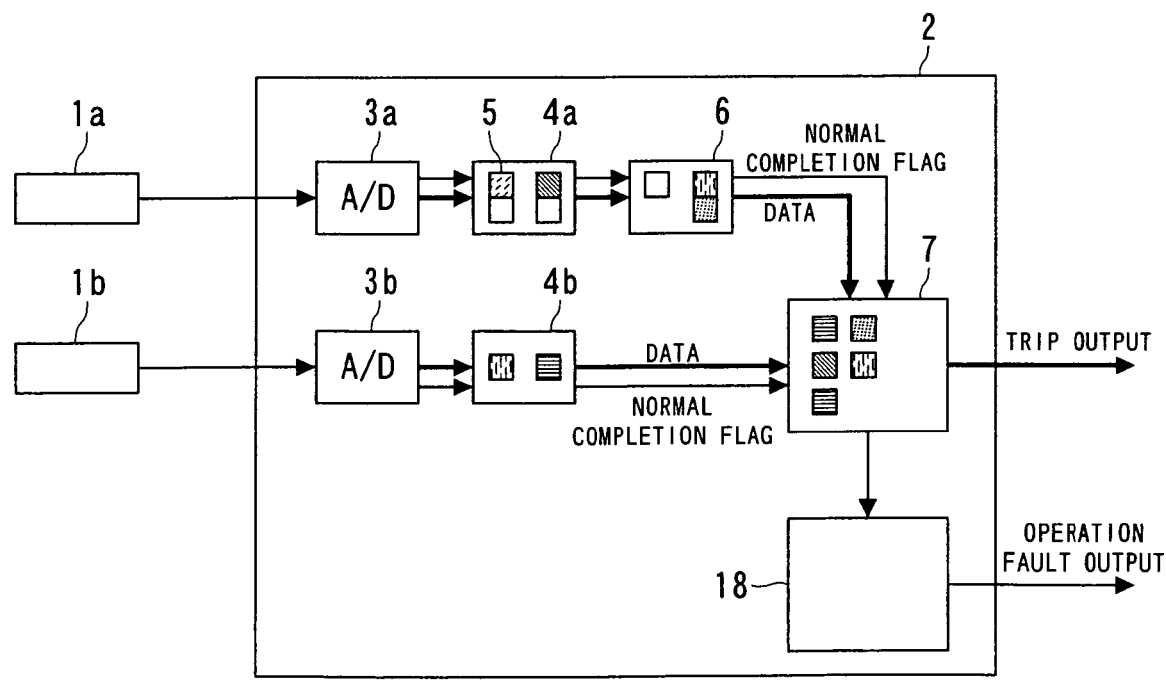
FIG. 10 is a block diagram illustrating a first self-diagnostic method in the safety protection instrumentation system of the present invention.

FIG. 10 is a diagram illustrating a self-diagnostic function in the safety protection instrumentation system for the nuclear reactor, including the functional units in which the logic patterns are verified.

Since the functional module includes many functional units 5, the outputs from the functional module are delayed by the amount corresponding to several clock periods. Accordingly, in normal termination, an operation flag is transmitted to the destination functional module, along with the output data. This operation flag is transferred between the multiple functional modules by relay. A diagnostic circuit 18 for detecting abnormalities determines whether the operation flag is set in a trip evaluator 7. If characteristics significantly different from normal characteristics are found, for example, if the operation flag does not exist over a predetermined time period, the diagnostic circuit 18 outputs an abnormal operation signal.

Figure 11:
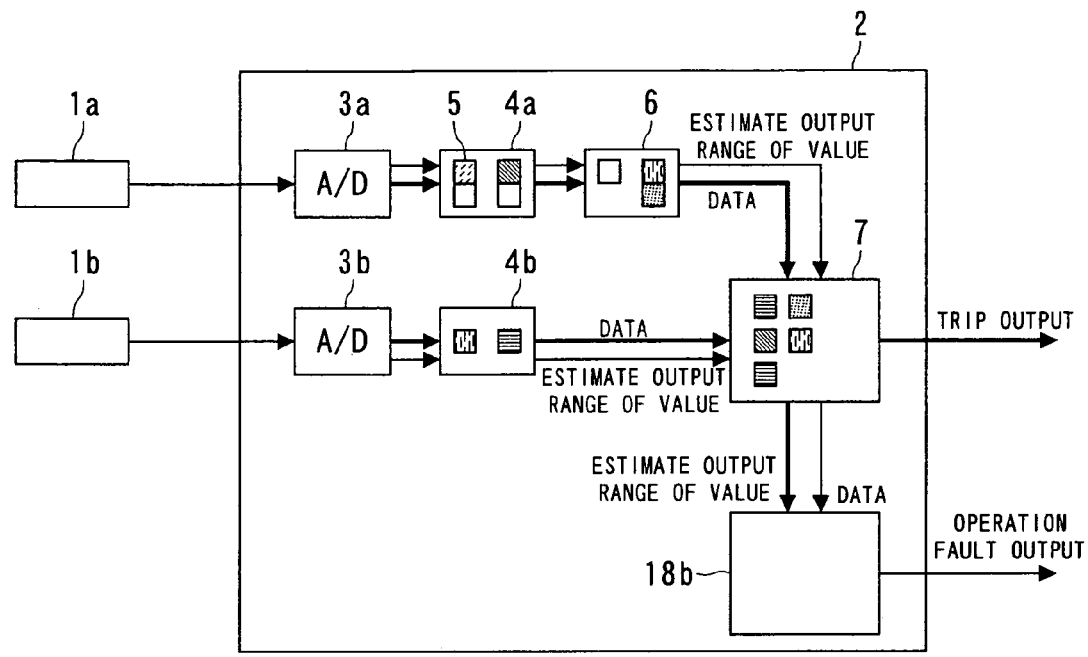
FIG. 11 is a block diagram illustrating a second self-diagnostic method in the safety protection instrumentation system of the present invention.

In addition, the diagnostic circuit 18 calculates a range of the output pattern corresponding to the input pattern of each functional module by an approximate expression, in addition to the operation flag, as shown in FIG. 11. If the actual output value is not within the range, the diagnostic circuit 18 outputs the abnormal operation signal.

According to the fourth embodiment, since the flag or the numerical range is set for every functional unit or functional module and the self-diagnostic function is provided, it is possible to prevent errors occurring after the safety protection instrumentation system has been mounted in the plant.

Fifth Embodiment

Figure 12:
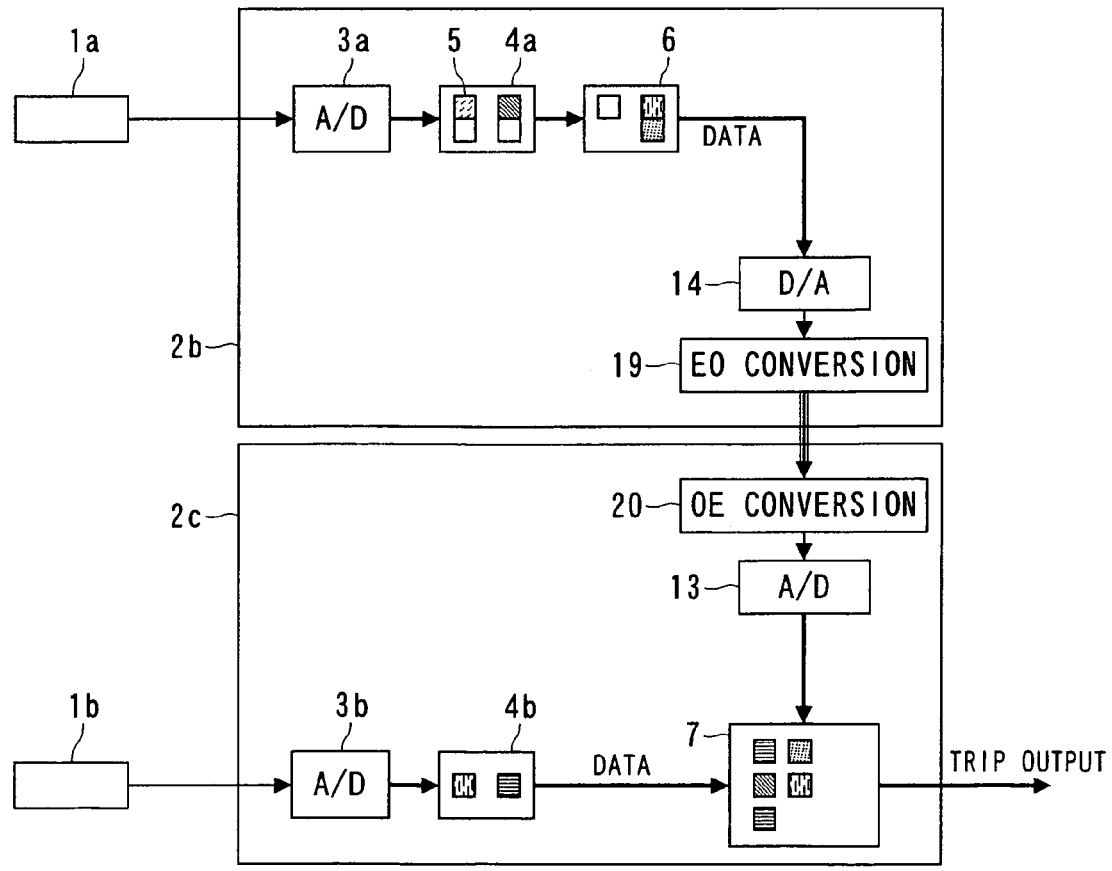
FIG. 12 is a block diagram illustrating signal separation in the safety protection instrumentation system of the present invention.

FIG. 12 is a diagram illustrating signal separation in the safety protection instrumentation system for the nuclear reactor, including the functional units in which the logic patterns are verified.

Optical transmission is adopted in the fifth embodiment in order to ensure the independency of the signal transmission in a first safety protection instrumentation system 2b and a second safety protection instrumentation system 2c. Specifically, in the first safety protection instrumentation system 2b from which signals are transmitted, transmission data is converted into an analog signal in a D/A element 14 and the analog signal is subjected to electrical-to-optical conversion in an EO converter (electrical-to-optical converter) 19 that transmits data concerning the light intensity or modulated data. In contrast, in the second safety protection instrumentation system 2c in which the signals are received, the data concerning the light intensity or the modulated data is subjected to optical-to-electrical conversion in an OE converter (optical-to-electrical converter) 20 and the data is converted into the digital value in an A/D element 13.

Figure 13:
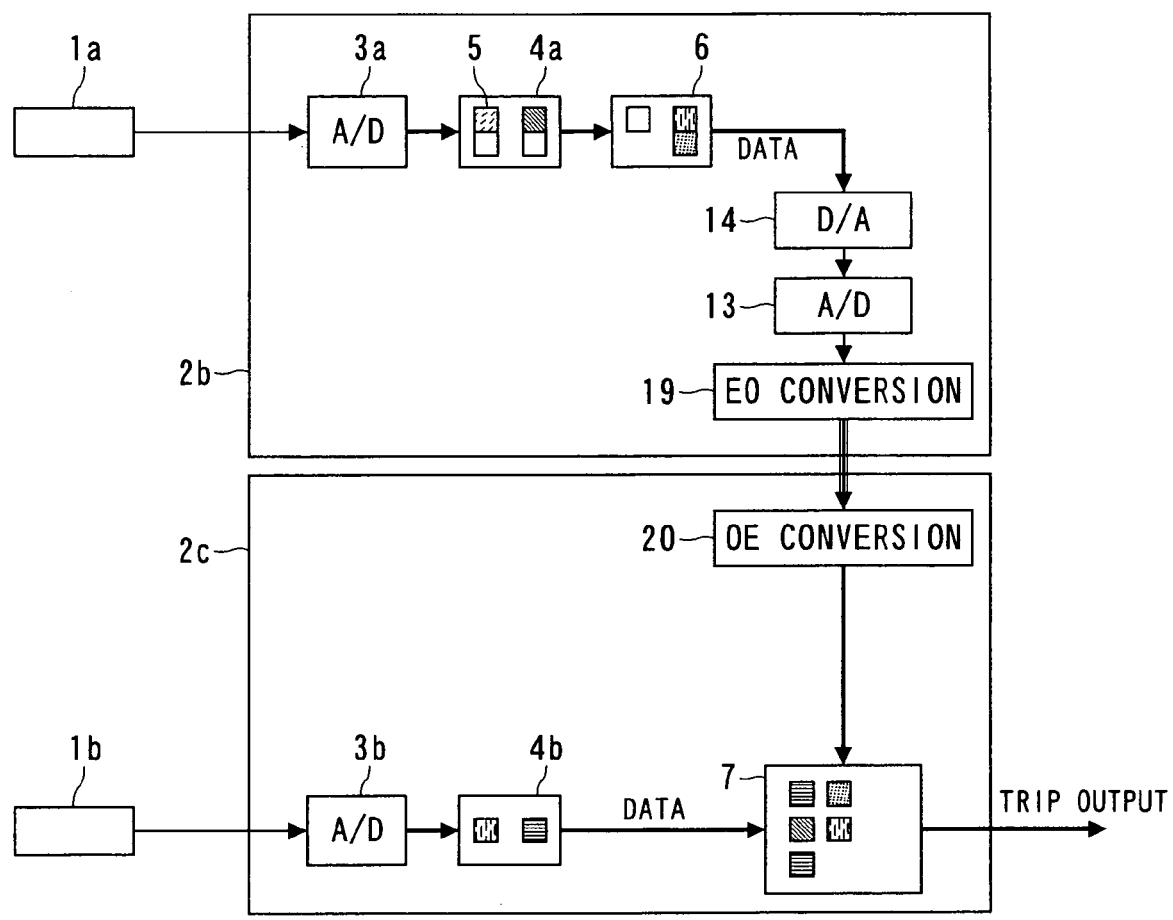
FIG. 13 is a block diagram showing a logic structure of the safety protection instrumentation system, in which a first safety protection instrumentation system is connected to a second safety protection instrumentation system.

In a logic structure shown in FIG. 13, in the first safety protection instrumentation system 2b, digital data processed in the FPGA is converted into an analog signal in the D/A element 14 and the analog signal is converted into the digital data again in the A/D element 13. The digital data is converted into the optical digital data in the EO converter 19, and the optical digital data is supplied to the second safety protection instrumentation system 2c. In the second safety protection instrumentation system 2c, the digital optical data supplied from the first safety protection instrumentation system 2b is converted into the digital data in the OE converter 20 and the digital data is used in the digital processing.

When the same digital value is distributed among multiple independent systems, the systems can simultaneously fail in response to the same input data if software malfunctioning in a certain data pattern exists in the systems. Accordingly, the safety protection instrumentation system according to the fifth embodiment converts data into the analog value to add a noise component to the transmitted signal. As a result, it is possible to prevent the same digital data from being simultaneously transmitted to different systems.

According to the safety protection instrumentation system of the fifth embodiment, it is possible to ensure the independency of the safety protection instrumentation system for the nuclear reactor, using the functional units, and to reduce the rate of occurrence of common mode failure, which is a challenge of the safety system adopting digital signal processing.

Sixth Embodiment

Figure 14:
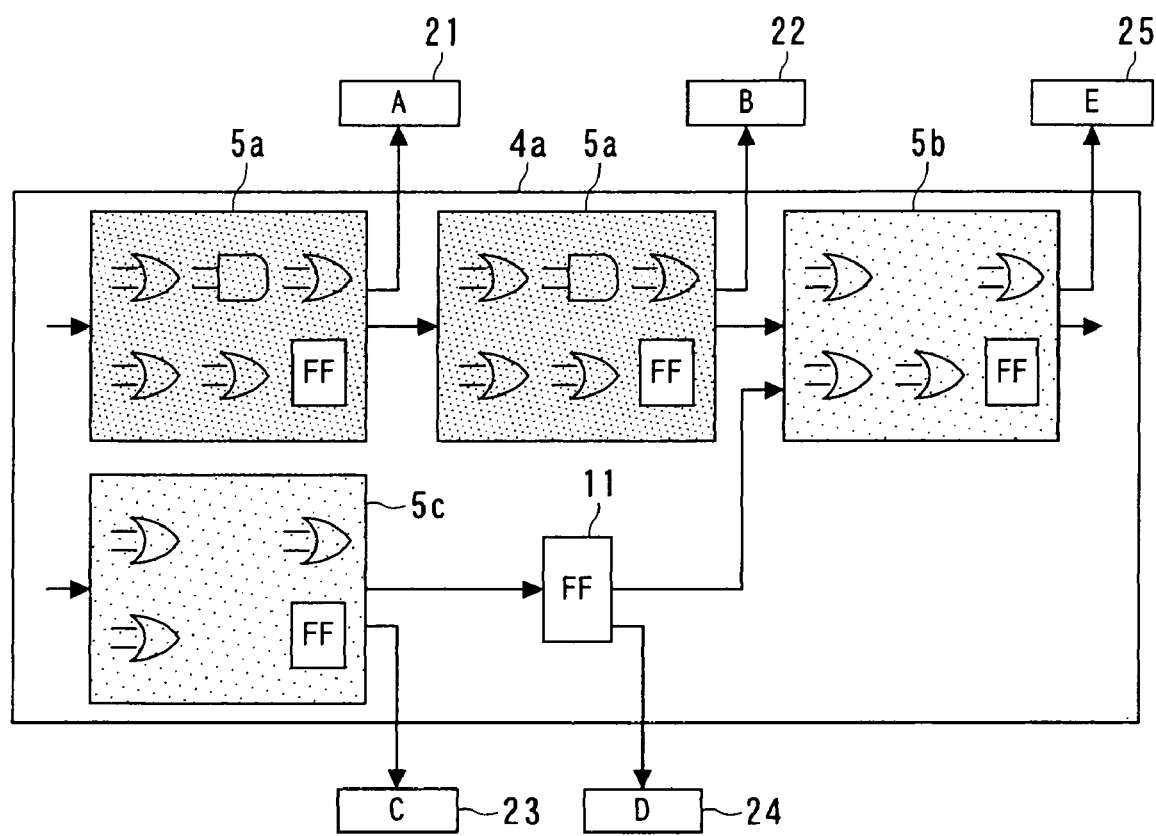
FIG. 14 is a block diagram illustrating a way to monitor a serial operation and timings of the functional units to verify and diagnose the safety protection instrumentation system of the present invention.

FIG. 14 is a block diagram showing a basic logic structure of a safety protection instrumentation system according to a sixth embodiment of the present invention.

In the safety protection instrumentation system in FIG. 14, the functional units 5a, 5b, and 5c are connected to each other and these functional units are stored in one FPGA.

The signal transmitted among these functional units is output in synchronization with the clock frequency owing to the presence of the flip-flop. The functional units may have different timings at which the signal is output. The safety protection instrumentation system according to the sixth embodiment has a logic structure in which the functional units sequentially transmit a baton, which is data, to perform the processing. For example, the output from the functional unit 5a is supplied to the functional unit 5b and, then, the signal processing is performed in the functional unit 5b.

In the logic structure having the functional units connected therein, the entire processing operation can be verified by monitoring the timing at which the baton (data) is transmitted. Specifically, as shown in FIG. 14, external pins A21, B22, C23, and D24 are used to monitor the signals output from the functional units and to verify whether the functional units operate at the timings as designed. During the operation, monitoring any shift of the timings allows any operational failure to be detected.

Figure 15:
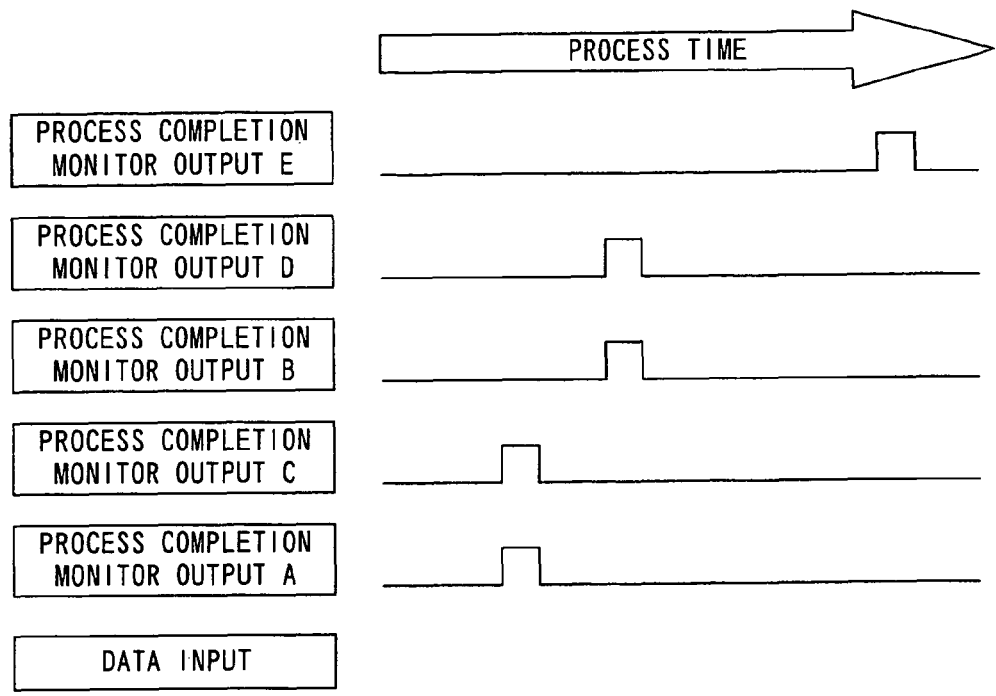
FIG. 15 is a schematic diagram showing an example in which output timings are monitored in the safety protection instrumentation system of the present invention.

FIG. 15 shows an example in which the output timings of the internal functional units are actually monitored from the external pin outside the FPGA. Referring to FIG. 15, an input signal is shown in the bottom line. The output signals from the external pins A21, B22, C23, D24, and E25 are shown in the upper lines.

When a signal (data) in the bottom line is input, the signal is sequentially transmitted to the logic from the bottom and the signal is finally output from the top output stage. The transmission timings of the signals can be confirmed on the basis of the multiple logic signals shown in FIG. 15. The transmission timings of the logic signals are specific to the design, and the timings of the logic signals can be monitored to verify whether the logic is implemented in the FPGA as designed. Providing an additional function of monitoring the timings of the logic signals even during the normal operation allows monitoring of any malfunction of the logic operation, caused by an increased delay time of the internal signal lines due to abnormal heating during the operation or the like.

According to the sixth embodiment, the safety protection instrumentation system is structured such that the functional units serially operate and sequentially transmit the signal. The transmission timings of the signals can be monitored to verify whether the logic is implemented in the FPGA as designed. In addition, the transmission order and timings of the signals can be monitored as an abnormality diagnosis method to build the higher reliable safety protection instrumentation system.

Seventh Embodiment

Figure 16:
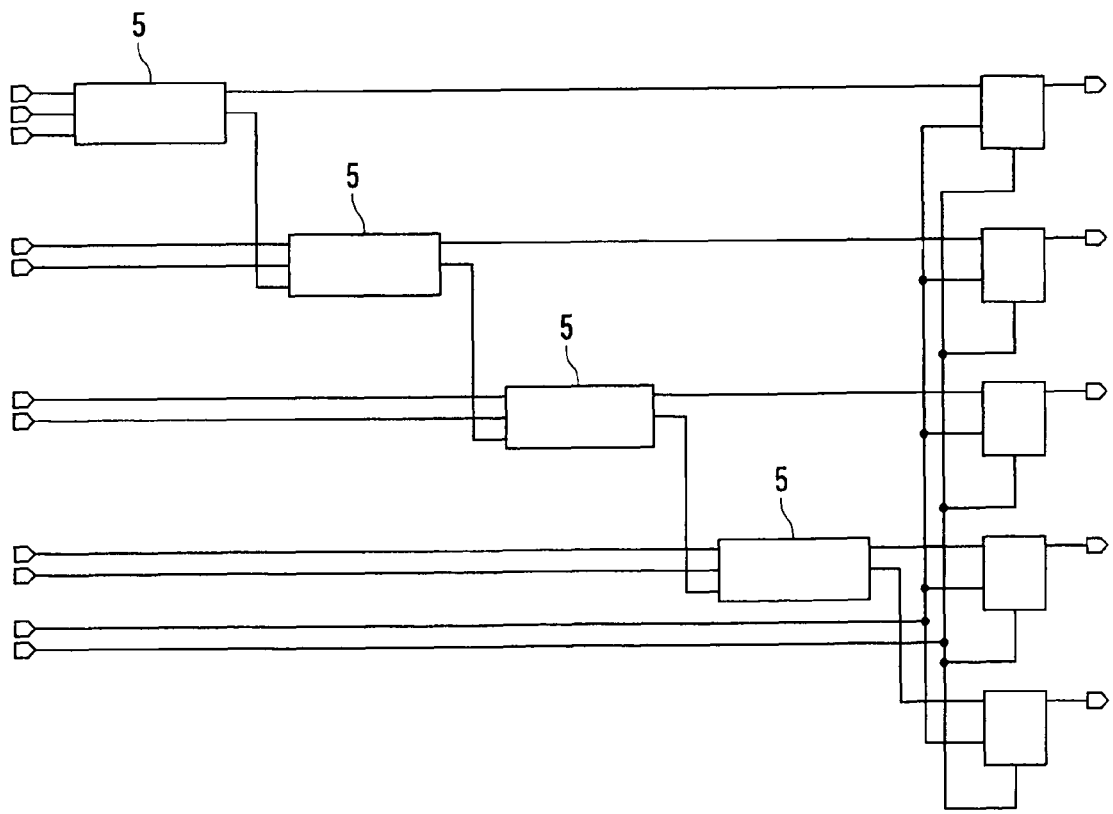
FIG. 16 is a block diagram showing an example of the connected functional units in the safety protection instrumentation system of the present invention.

FIG. 16 is a block diagram showing a logic structure of a safety protection instrumentation system according to a seventh embodiment.

The safety protection instrumentation system shown in FIG. 16 has a logic structure, for example, in which the same four functional units 5 are connected in series and the signals are output in synchronization with the clock frequency owing to the presence of the flip-flops. In the safety protection instrumentation system having the above structure, the verification of whether the functional units 5 has the same logic structure as the single functional unit 5 before the connection can ensure that the same functions as the ones verified in the single functional unit 5 are implemented in the safety protection instrumentation system.

Specifically, in the functional units 5 of the safety protection instrumentation system shown in FIG. 16, the soundness of the performance has been validated in the testing of the single functional unit. The soundness of the functional units 5 in the safety protection instrumentation system can be ensured by connecting the functional units 5 in the manner shown in FIG. 16 and visually verifying whether the performance is kept after the synthesis.

INDUSTRIAL APPLICABILITY

In the safety protection instrumentation system and the method of operating the system according to the present invention, it is possible to improve the safety of the safety system for the nuclear reactor using the hardware logic by preventing logic errors or errors caused by the timings of the signal processing. Hence, the present invention is highly available for the operation of the nuclear reactor.

The invention claimed is:

1. A safety protection instrumentation system for a nuclear reactor constructed by using a digital logic, wherein the digital logic comprises:
   a plurality of functional units having logic circuitry in which output logic patterns resulting from input logic patterns have been verified in advance of installation of the logic circuitry in the safety protection system; and
   a functional module formed by combining the plurality of functional units so as to form a logic structure in which the logic structure of the combination of the plurality of functional units is different from the logic structure of each of the plurality of functional units individually, wherein,
   the functional module includes only functional units having a same logic circuit gate structure as that of a functional unit whose performance has been verified in advance, and
   software which describes effective programs statements executed by hardware and input pattern groups indicating operation paths, uses branch coverage or toggle coverage for evaluating the ratio of the input logic patterns, and determines whether the output logic patterns corresponding to the input logic patterns coincide with predicted patterns calculated from design specifications to verify that the functional units are correctly connected to each other.

2. The safety protection instrumentation system according to claim 1, wherein, each of the functional units individually implements the output logic patterns resulting from the input logic patterns solely on hardware, and determines whether the output values coincide with predicted values calculated from design specifications.

3. The safety protection instrumentation system according to claim 1, wherein the functional module formed by a combination of the plurality of functional units further comprises:
   a register through which an output from at least one functional unit is transmitted; and
   a delay element used for adjusting the timing of signal processing in the functional unit.

4. The safety protection instrumentation system according to claim 1, wherein the functional module formed by a combination of the plurality of functional units further comprises:
   a register through which an output from at least one functional unit is transmitted,
   wherein the system uses handshaking for transferring a signal from the functional unit that drives the register at different clock frequencies, among the functional units.

5. The safety protection instrumentation system according to claim 1, wherein the safety protection instrumentation system is structured so as to generate input patterns in accordance with design specifications of the functional module and to determine whether the output patterns corresponding to the input patterns in the functional module coincide with predicted values calculated from the design specifications.

6. The safety protection instrumentation system according to claim 1, wherein the safety protection instrumentation system further comprises:
   an analog-to-digital element that converts an analog signal pattern in accordance with design specifications of the functional module into a digital value to generate a digital input pattern; and
   a digital-to-analog element that converts an output corresponding to an input in the functional module into an analog value,
   wherein the system determines whether the analog value coincides with a predicted value calculated from the design specifications.

7. The safety protection instrumentation system according to claim 1, wherein the safety protection instrumentation system performs addition or comparison of two variables in the functional unit to replace either one of the two variables with a constant that can be specified with an address having a number of bits smaller than that of the variable.

8. The safety protection instrumentation system according to claim 1,
   wherein the functional unit has a function of passing an operation flag indicating normal completion of the operation,
   wherein the functional module has a function of monitoring the operation flag, and
   wherein the safety protection instrumentation system further comprises:
      a trip evaluator that receives an output from the functional module and determines whether the operation flag is set; and
      an abnormality diagnosis circuit that outputs an abnormal operation signal if the operation flag is not set.

9. The safety protection instrumentation system according to claim 1,
   wherein the functional unit has a function of calculating maximum and minimum output values by a simple expression and a function of passing the maximum and minimum output values, and
   wherein the safety protection instrumentation system further comprises:
      a trip evaluator that compares signal values with the maximum and minimum output values to determine whether the signal values are appropriate; and
      an abnormality diagnosis circuit that outputs an abnormal operation signal.

10. The safety protection instrumentation system according to claim 1, wherein the safety protection instrumentation system further comprises:
    a first safety protection instrumentation system that converts a digital output into an analog value and converts the analog value into an optical signal; and
    a second safety protection instrumentation system that converts the optical signal into an analog value and converts the analog value into a digital value,
    wherein the first safety protection instrumentation system is connected to the second safety protection instrumentation system.

11. A method of operating a safety protection instrumentation system for a nuclear reactor constructed by using digital logic, comprising:

verifying output logic patterns resulting from input logic patterns in functional units in the safety protection instrumentation system in advance of installation of the logic circuitry in the safety protection system;

combining a plurality of functional units to form a functional module so as to form a logic structure in which the logic structure of the combination of the plurality of functional units is different from the logic structure of each functional unit individually wherein the functional module includes only functional units having a same logic circuit gate structure as that of a functional unit whose performance has been verified in advance;

describing effective programs statements executed by hardware and input pattern groups indicating operation paths;

using branch coverage or toggle coverage for evaluating the ratio of the input logic patterns; and determining whether the output logic patterns corresponding to the input logic patterns coincide with predicted patterns calculated from design specifications to verify that the functional units are correctly connected to each other.

12. The method of operating a safety protection instrumentation system according to claim 11, further comprising:

serially performing data processing in the functional units in the safety protection instrumentation system in the order of connection;

confirming serial transmission of a signal by monitoring an output timing; and determining whether the signal is output as designed to verify the performance of the safety protection instrumentation system.

13. The method of operating a safety protection instrumentation system according to claim 11, further comprising:

verifying whether the functional units in the safety protection instrumentation system have a same structure as an internal structure when performance of the functional units is verified.

* * * * *